United States Patent Office 3,705,044
Patented Dec. 5, 1972

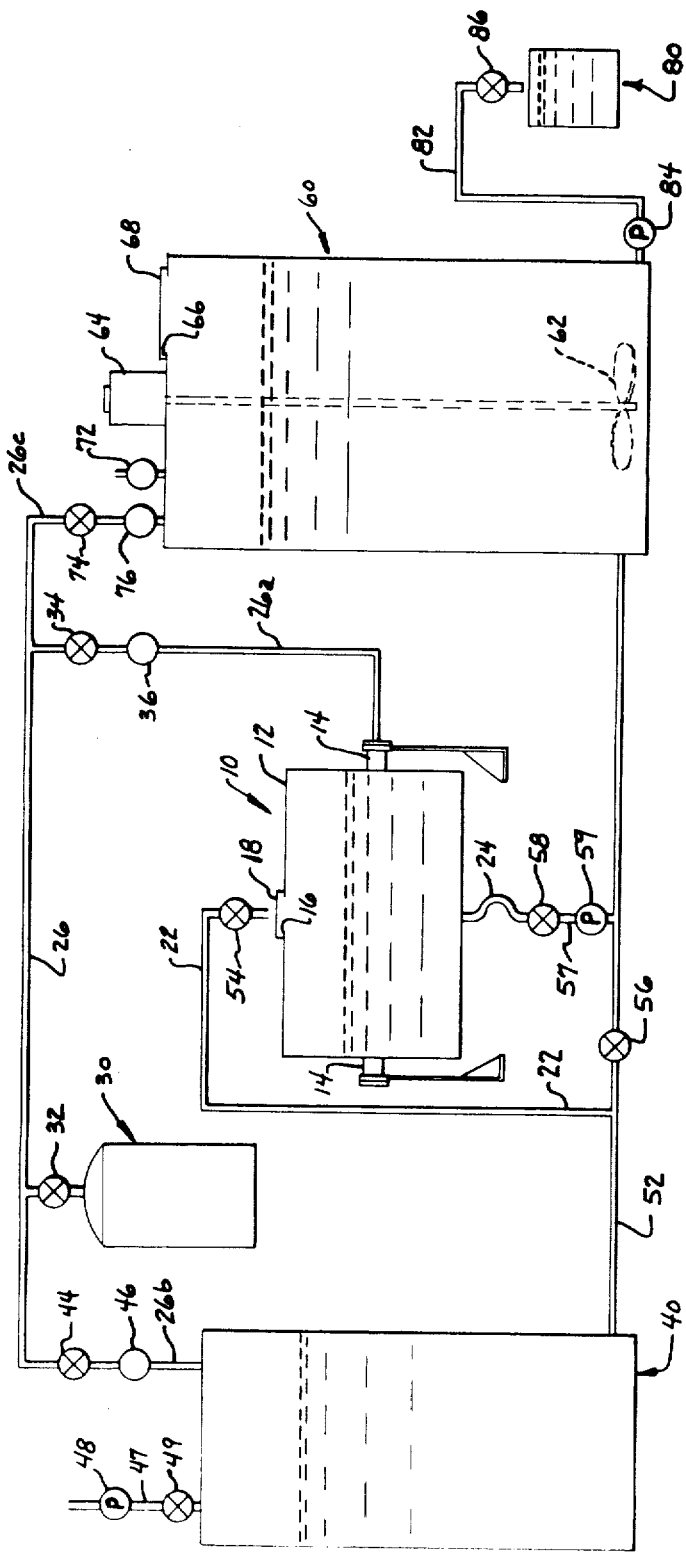

3,705,044
METHOD FOR MANUFACTURING PAINTS AND INKS, AND PRODUCT PRODUCED THEREBY
David D. Pipkins, Downers Grove, Ill., assignor to The Valspar Corporation, Minneapolis, Minn.
Filed Oct. 15, 1970, Ser. No. 80,833
Int. Cl. C09d 11/00, 11/02, 11/16
U.S. Cl. 106—20      4 Claims

ABSTRACT OF THE DISCLOSURE

The apparatus includes a storage tank for solvents, a ball mill, and a tinting tank. Carbon dioxide supply lines are connected to each of these. Addition of carbon dioxide under pressure to the storage tank precarbonates the organic solvent and provides a carbonated product when milled with a pigment. The carbon dioxide can be added at the mill either alone, or in combination with precarbonation. Solvents or diluents are added in the tinting tank and the resulting product is a carbonated paint or ink which has improved anti-skinning characteristics. The storage tank arrangement reduces emissions of organic solvents into the atmosphere. The use of carbon dioxide reduces flammability in the system, of the product, and during subsequent use. Improved conductivity of the carbonated solvent also results.

---

The method includes milling the pigment and organic solvent in the presence of carbon dioxide added through precarbonation or added in the mill. Precarbonation of the organic solvent is achieved by maintaining an atmosphere of carbon dioxide in the storage tank at a pressure above the pressure at which the organic solvent has an absorption coefficient greater than one volume of carbon dioxide per volume of solvent, and delivering the organic solvent into the tank at a pressure above the carbon dioxide pressure.

A container has a carbonated paint or ink therein and the carbon dioxide is interstitially spaced in an amount sufficient to evolve into the head space of the container to provide a protective atmosphere.

BACKGROUND

The invention pertains generally to the manufacture of paint and ink. More particularly, the invention pertains to such manufacture by means of a system which uses carbon dioxide for pressurizing and inerting the products, to the manufacture of paint and ink of the type having a pigment and an organic solvent and which includes grinding and milling using carbon dioxide for vastly improving dispersion of the pigments in the solvent.

Paint is a mixture of a liquid and one or more powders called pigment. The liquid that carries the pigment is called a vehicle which may include solvents or thinners, binders, driers, and plasticizers. Typical solvents are turpentine, petroleum distillates, aromatic hydrocarbons, etc. Most solvents are classified as "organic solvents." The term paint, as used herein, is intended to include ink, colorants and the like which are manufactured from pigments and vehicles or solvents.

In the manufacture of paint, an amount of vehicle is mixed with pigment in a mill such as a ball mill, sand mill, or roller mill. In the mill the pigment particles are dispersed throughout the vehicle. While this is called "grinding," little breaking up of the pigment occurs and the action is primarily a mechanical dispersion. This operation, as presently performed, can take up to 12–16 hours. The manufacturing capability of a mill could be increased if the time of this operation were materially reduced. After grinding, the paste is reduced by the addition of more vehicle, solvents and driers. A workman called a tinter adds pigment to give the paint the exact characteristics desired. The paint is then laboratory tested for compliance with standards. The paint is strained, stored, and finally packaged.

During the manufacture of paint, ink, and the like, a fire hazard exists because of the use of flammable materials. For example, one area of fire hazard is at the mill where the pigment is "ground" and a temperature increase results. Another area is where the material (e.g. ink) is being applied as by a press. A static spark can ignite the volatile solvent and cause an explosion. It is advantageous to suppress flammability and reduce the fire hazard.

It has been mentioned above that most solvents are "organic solvents." Studies by governmental agencies have shown that certain organic solvent vapors enter into photochemical smog reactions which result in the formation of ozone, aerosols and eye irritating compounds. Thus the emission of organic solvents contributes to air pollution. Many regulations have been adopted and are being adopted, to limit air pollution. Possibly the most restrictive regulation to date is Rule 66 of the Air Pollution Control District—County of Los Angeles. This regulation, and others, limits the allowable emission of certain unexempt organic solvents in the manufacture and use of paint. Thus it is desirable to provide a way of manufacturing paint without emitting solvents into the atmosphere. Additionally, since loss of solvents may be as much as 4% in present manufacture, a definite savings of material would be possible.

SUMMARY

The present invention relates generally to a method and apparatus for manufacturing paint and ink. More particularly, the invention relates to the manufacture of paints and inks of the type which include a pigment and an organic solvent, and which manufacture includes improved dispersion of the pigment in the organic solvent. The invention also relates to the manufacture of a new paint or ink product which includes pigment, organic solvent, and carbon dioxide.

It is a general object of the present invention to overcome the above-described deficiencies of the prior art as it relates to paint and ink of the type which includes a pigment and an organic solvent.

Another object is to provide a product with reduced fire hazard.

It is another object to provide a product in accordance with the foregoing object which provides its own self-inerting atmosphere.

Still another object of the invention is to provide a product which overcomes the problem of "skinning" during storage.

Yet another object of the present invention is to provide a method and apparatus for manufacturing paint and ink with reduced emission of organic solvents.

Another object is to provide a method and apparatus for manufacturing paint and ink of the type which includes a pigment and an organic solvent and by which improved dispersion of the pigment is achieved.

It is another object to provide a method and apparatus in accordance with the foregoing object in which the improved dispersion is achieved by introducing carbon dioxide into the product.

Still another object is to provide a method and apparatus for manufacturing paint and ink which includes utilization of a system using carbon dioxide for inerting and pressurizing the products.

These, and other objects and advantages of the present invention, will become apparent as the same becomes better understood from the following detailed description when taken in conjunction with the accompanying drawing.

DRAWING

The drawing is a diagrammatic view of an apparatus constructed in accordance with the present invention, and which is illustrative of one apparatus for performing the method of the present invention and producing the novel product.

DESCRIPTION

One of the major operations in the manufacture of paint and ink is properly dispersing the pigment particles in the liquid vehicle or solvent. Various apparatus are provided for this purpose including ball mills, sand mills, roller mills and the like. The basic purpose of these mills is to intimately mix and wet the solid pigment particles with the liquid vehicle or solvent. This is a much more difficult process than would be readily appreciated and the usual milling or grinding time in a ball mill by present methods, ranges from about 6 hours for a formula that is easy to grind (e.g. a titanium dioxide formula white paint) up to 24 hours for a formula that is difficult to grind (e.g. a carbon black formula black paint). An average formula can take up to 12–16 hours of grinding time.

It has been found that the time required to disperse the pigment can be markedly reduced, for example to about ⅓ the time previously required or less, if a pressurized carbon dioxide atmosphere is utilized during milling. In other words, it has been found that carbon dioxide in substantial quantities in the mixture of paint pigment and solvent will markedly aid dispersion of the pigment. This appears to result at least in part, from an increased energy level and Brownian motion caused by the presence of carbon dioxide. In accordance with the present invention, the carbon dioxide can be introduced directly into the mill either before or during milling. The pressure of carbon dioxide added is preferably in the range of 7 to 100 p.s.i.g.

It has been found that it is possible to achieve these improved results by introducing the carbon dioxide atmosphere into the liquid organic solvent prior to entry into the mill; for example, while it is in a storage tank. By proper regulation, the organic solvent will contain the desired amount of carbon dioxide when introduced into the mill. The carbon dioxide can be absorbed by the organic solvent by first pressurizing the storage tank and then pumping the organic solvent into the tank at a pressure above the pressure of the carbon dioxide atmosphere. Since the organic solvent will absorb the carbon dioxide, the solvent can be pumped into the tank without venting the same, as is presently required. It is estimated that as much as 4% of solvents are lost through venting and, with some solvents, this adds to pollution of the atmosphere. By carbonating the solvent, vaporization of the solvent is suppressed. Also under some conditions, the pressurized tank permits the delivery of the solvent to the mill without necessitating a pump as is presently required.

If sufficient carbon dioxide is interstitially spaced in the organic solvent through absorption, no carbon dioxide need be added at the mill. Preferably the storage tank pressure is at least 50 p.s.i.g. to achieve optimum results in this event. However, it is contemplated that carbon dioxide can be supplied to both the storage tank and the mill, if desired.

After the pigment has been dispersed or ground in the liquid solvent by the mill, it is delivered to a tinting tank where a tinter adds additional solvent and pigments, as described above. Surprisingly, it has been found that, in addition to a reduced grinding or milling time, the pigments and organic solvents ground in the presence of carbon dioxide have a greater "tinctorial strength." This is also indicative of improved dispersion of the pigment. The result is that the product from the mill can have greater amounts of solvents or diluents added and yet obtain the required coverage of the paint or ink.

After tinting, the paint or ink can then be stored or put into a container for shipping. If a carbonated solvent is used during the tinting operation, the resulting paint or ink contains a high amount of carbon dioxide; preferably in excess of one volume and up to four volumes of carbon dioxide per volume of the organic solvent in the paint or ink. Some of this carbon dioxide can then evolve into the head space of the container to maintain an inert atmosphere in the container. In a paint can, this evolving continues through several openings by a consumer, and reduces loss of solvent and also inhibits "skinning" of the paint. In an industrial use of ink, this evolving provides an inert atmosphere above the ink and reduces the fire hazard. It has also been found that a carbonated ink has an increased conductivity which helps prevent the build up of dangerous static charges.

Reference is now made more particularly to the drawings which diagrammatically illustrate the best presently known apparatus of the present invention and which apparatus is one means of performing the method of the present invention.

The mill is in the form of a ball mill 10 which is essentially a large drum 12 mounted for rotation about a horizontal axis 14. As is usual, the mill contains pigment, vehicle or solvent, and balls, pebbles or the like which are tumbled as the mill rotates to intimately disperse the pigments in the solvent. The drum 12 has a removable cover 18 covering an opening 16 through which the pigments can be placed into the mill. The solvent is supplied through a conduit 22 arranged to dump through opening 16. Carbon dioxide is introduced into the mill through a branch conduit 26a which is connected to a carbon dioxide supply tank 30 by means of a main conduit 26. The carbon dioxide is preferably fed to the mill at a pressure in the range of 7 to 100 p.s.i.g. Branch conduit 26a is advantageously coaxial with axis 14 so that carbon dioxide can be supplied while the drum 12 is rotating. A valve 32 is conveniently provided at the outlet of tank 30. A valve 34 and a pressure regulator 36 are advantageously interposed in conduit 26a to control the flow of carbon dioxide to the mill. The drum 12 has an outlet to which a flexible conduit 24 can be connected to draw off the ground pigment and organic solvent.

A storage tank 40 for the organic solvent preferably is unvented. A second branch conduit 26b is connected to the tank 40 and to main conduit 26 to feed carbon dioxide to the tank. A valve 44 and a pressure regulator 46 are interposed in conduit 26b to control the flow of carbon dioxide to the storage tank. After the tank 40 has been supplied with carbon dioxide under pressure, for example at 50 p.s.i.g., the organic solvent is pumped into the tank through a line 47 by a pump 48. A valve 49 is provided in line 47. The pump is arranged to supply the organic solvent into the tank 40 at a pressure above the pressure of the carbon dioxide. The solvency of the carbon dioxide increases with pressure increase and, as the carbon dioxide is absorbed by the solvent, the amount of free carbon dioxide is reduced. The carbon dioxide is absorbed and becomes interstitially spaced in the solvent and there is effectively no pressure increase as the solvent is supplied into the tank.

At the bottom of storage tank 40 is an outlet conduit 52 which leads to the conduit 22 and to a tinting tank 60. A valve 54 in conduit 22 controls flow of the carbonated organic solvent to the mill 10; while a valve 56 in conduit 52 controls flow to the tinting tank 60. It will be noted that no pump is provided for moving the carbonated organic solvent to the mill or tinting tank. However, a pump could be provided if desired or if required, as when the solvent must be lifted a height beyond what the pressure of carbon dioxide will lift. A conduit 57 is connected to conduit 52 and flexible conduit 24 to effectively connect the mill 10 to the tinting tank 60. A valve 58 and a pump 59 are interposed in conduit 57 to control the flow from the mill 10.

As is usual, tinting tank 60 is provided with a mixer or agitator 62 driven by a motor 64 to mix the milled pigment and solvent with any additional solvents, pigments or additives. The tank is provided with an opening 66 through which the additional pigments and additives may be added. Opening 66 is provided with a cover 68 which may or may not seal the tank 60. The tank is provided with a poppet-type vent 72 so that the tank is vented. If cover 68 does not seal the tank, it should be arranged that a slight pressure (e.g. 3–6 p.s.i.g.) can be maintained in the head space. The head space is filled with carbon dioxide evolved from the paint or ink. This reduces fire hazard and inhibits vaporization of the solvent. While the evolved carbon dioxide is sufficient for these purposes most of the time, the tank is advantageously connected to the main conduit 26 by way of branch conduit 26c in which is interposed a valve 74 and a pressure regulator 76. In this manner, the tank 60 can be maintained with an inert atmosphere even when no product is contained therein.

After the above-described operation, there is a carbonated paint or ink product. This may be dispensed into a tank or can 80 through a conduit 82 connected to tinting tank 60. A pump 84 and a valve 86 are provided to control flow through the conduit 82. This dispensing can be accomplished either automatically or by a manual operation.

The carbonated product in can 80 preferably contains in excess of one volume of carbon dioxide per volume of organic solvent therein and up to about four volumes per volume. In this manner, the carbon dioxide will evolve into the head space of the container and provide an inert atmosphere. In the case of paint, it has been found that this evolved carbon dioxide inhibits vaporization of the solvent and reduces "skinning" tendencies. In the case of ink, it has been found that the carbon dioxide will evolve and provide a protective blanket even in an open container. This aids in flammability suppression.

It has been found that carbonation increases the flash point of the organic solvents. This also aids in reduced flammability. It has also been found that carbonation increases the conductivity of the solvents and it is believed that this helps reduce build up of static charges which might cause an explosion.

In using carbonated ink in a printing operation, it has been found that there is as much as 20% greater printout. In other words, there is better lay or coverage with the carbonated ink. While one cannot be certain, this is possibly due to the increased conductivity of the carbonated ink and less static on the printing rolls.

The following examples will further illustrate the practice of this invention:

EXAMPLE 1

|   | Parts by wt. |
|---|---|
| 1. Benzidene Yellow | 343 |
| 2. Primrose Chrome Yellow | 1588 |
| 3. Toluol | 361 |
| 4. Ethyl cellulose solution 25% N.V. in lacquer diluent hydrocarbon solvent | 962 |
| 5. Zinc resinate and ethyl cellulose solution * | 4962 |
| 6. Lacquer diluent hydrocarbon | 1784 |

*The ingredient has the following composition by weight:

|   | Percent |
|---|---|
| Zinc resinate | 37 |
| Ethyl cellulose | 3 |
| Lacquer diluent | 5 |
| Acetone | 7 |
| Isopropyl alcohol | 11 |
| Hexane | 25 |
| Toluol | 12 |

The above is a formula for yellow gravure ink. Ingredient No. 6 is added after milling for reduction. Ingredients 1–5 were milled in a ball mill of a laboratory size. The mill had 2388 grams of steel balls therein. Four identical mills were utilized in the tests and each mill was turned the same number of revolutions for the same length of time. One mill held a control sample, and the other mills were charged with carbon dioxide to the pressure indicated, stabilized for one hour, and then repressured to the pressure indicated. Various tests were run for different lengths of milling time. The ground ingredients 1–5 were then reduced. Each sample was tested for fineness of grind by a North Standard grind gauge which is used to measure dispersion. The optical density measured on a Densichron densitometer manufactured by Welch Scientific Co., Skokie, Ill. The following results were obtained:

| Test | Grind time, hour | $CO_2$, p.s.i.g. | Fineness | Increased tint strength, percent |
|---|---|---|---|---|
| 1 | 1 | None | 2 | (¹) |
|   | 1 | 15 | 2½ | 4 |
|   | 1 | 50 | 3 | 7 |
|   | 1 | 75 | 4 | 11 |
| 2 | 2 | None | 5½ | (¹) |
|   | 2 | 15 | 6 | 10 |
|   | 2 | 50 | 6 | 7 |
|   | 2 | 100 | 6½ | 9 |
| 3 | 4 | None | 7 | (¹) |
|   | 4 | 15 | 8 | 8 |
|   | 4 | 50 | 8 | 10 |
|   | 4 | 100 | 8 | 10 |

¹ Control.

EXAMPLE 2

|   | Parts by weight |
|---|---|
| 1. Raven 40 Black Densed | 122 |
| 2. Atomite | 300 |
| 3. Nuact paste | 25 |
| 4. 13% Bentone #38 slurry | 153 |
| 5. Medium oil alkyd resin (Fed. Spec. TT-R-266 Type 3) | 918 |
| 6. Methyl ethyl ketoxime | 6 |
| 7. 24% lead napthenate | 37 |
| 8. 4% calcium | 25 |
| 9. Mineral spirits | 319 |
| 10. Same as ingredient #5 | 2223 |
| 11. Oil modified polyurethane resin @ 60% N.V. in mineral spirits | 649 |
| 12. 6% cobalt napthenate | 12 |
| 13. 6% manganese napthenate | 12 |

The above is a formula for a black enamel paint. Ingredients 1–9 were milled as in Example 1 except 10 hours were allowed for stabilization. Ingredients 10–13 were added after milling. The finished product was reduced with titanium dioxide paste and measurements taken as in Example 1. The following results were obtained:

| Test | Grind time, hours | $CO_2$, p.s.i.g. | Fineness | Increased tint strength, percent |
|---|---|---|---|---|
| 4 | 4 | None | 4½ | (¹) |
|   | 4 | 15 | 4½ | 4 |
|   | 4 | 50 | 5 | 8 |
|   | 4 | 100 | 5½ | 14 |

¹ Control.

EXAMPLE 3

Ingredients as in Example 1 were added to a ball mill; except ingredients 3–6 were pressurized at 100 p.s.i.g. of carbon dioxide. Thus the solvent was precarbonated. A control sample was run simultaneously. The finished products were reduced and measurements taken as in Example 1 with the following results:

| Test | Grind time, hours | $CO_2$, p.s.i.g. | Fineness | Increased tint strength, percent |
|---|---|---|---|---|
| 5 | 2½ | None | 3½ | (1) |
|   | 2½ | 100 | 4 | 6 |
| 6 | 6 | None | 4½ | (1) |
|   | 6 | 100 | 4½ | 13 |

1 Control.

EXAMPLE 4

Ingredients as in Example 1 except that ingredient 6 was replaced by xylol, 890 parts of the xylol was added to the mill, and all the ingredients were exposed to carbon dioxide prior to milling but at varying pressures. The following results were obtained:

| Test | Grind time, hours | $CO_2$, p.s.i.g. | Fineness | Increased tint strength, percent |
|---|---|---|---|---|
| 7 | 4 | None | 4 | (1) |
|   | 4 | 7 | 4 | 7 |
|   | 4 | 15 | 4¾ | 21 |
|   | 4 | 25 | 4 | 15 |
|   | 4 | 50 | 4 | 9 |
|   | 4 | 75 | 4¾ | 9 |
|   | 4 | 100 | 5 | 14 |

1 Control.

EXAMPLE 5

Parts by weight
1. Benzidene Yellow _____ 318
2. Primrose Chrome Yellow _____ 1702
3. V.M. & P. naphtha _____ 1064
4. Ethyl cellulose solution 25% N.V. in lacquer diluent hydrocarbon solvent _____ 1064
5. Zinc resinate and ethyl cellulose solution ____ 5320
6. Toluol _____ 532

The ingredients 3–6 were precarbonated as in Example 3. The following results were obtained:

| Test | Grind time, hours | $CO_2$, p.s.i.g. | Fineness | Increased tint strength, percent |
|---|---|---|---|---|
| 8 | 4 | None | 6 | (1) |
|   | 4 | 100 | 6½ | 12 |

1 Control.

EXAMPLE 6

Ingredients as in Example 1 were ground for four hours and then reduced. Various samples of this ink were then exposed to carbon dioxide at various pressures and agitated for 15 minutes. The following results were obtained:

| Test | Grind time | $CO_2$, p.s.i.g. | Fineness | Increased tint strength, percent |
|---|---|---|---|---|
| 9 |  | None |  | Control 1 |
|   |  | 30 |  | 4 |
|   |  | 50 |  | 5 |
|   |  | 100 |  | 10 |

1 Control.

The above examples show that paints and inks, from formulas easy to grind to formulas difficult to grind, have improved fineness when ground in the presence of carbon dioxide, either by precarbonation of solvents or by introduction into the mill. The examples also show that the addition of carbon dioxide to these products, by precarbonation, postcarbonation, or adding in the mill, improves the "tinctorial strength" of the end product. It can be seen that the tests include a broad range of organic solvents.

SKIN RETARDING EFFECT BY CARBONATION

Two varnishes which normally skin readily were tested on a comparison of uncarbonated and carbonated for skinning characteristics. The varnishes were polyurethane gloss varnish, and phenolic-wood oil marine gloss varnish. The carbonated samples were carbonated in a pressure chamber at 15 p.s.i.g. for 19 hours in open, friction-top pint cans. As soon as they were removed from the pressure chamber the lids were applied. The cans were stored at room temperature along with corresponding uncarbonated sample cans of the same lot. Periodically these cans were reopened and observed for skins. Before reclosing the free-gas was wafted away with brisk fanning. Carbonation has a definite skinning retardation effect.

POLYURETHANE GLOSS VARNISH

| Days: | Uncarbonated can | Carbonated can |
|---|---|---|
| 0 | Test started | Test started. |
| 3 | Soft skin forming on lid | Pressure release when opened; no skinning. |
| 5 | Skin forming on varnish surface, skin on lid firm. | No skin evidence, no pressure evident when lid removed. |
| 10 | Firm skin on varnish |  |
| 14 | Firm skin | No skin. |
| 20 | do | Do. |
| 27 | do | Do. |

PHENOLIC-WOOD OIL MARINE VARNISH

| 0 | Test started | Test started. |
|---|---|---|
| 3 | Skin forming on lid and on varnish surface. | Pressure release when opened; no skinning. |
| 5 | Firm skin | No skin evident, no pressure release. |
| 10 | do |  |
| 14 | do | No skin. |
| 20 | do | Do. |
| 27 | do | Soft skin forming on lid and on varnish surface. |

EFFECT OF CARBONATION ON FLASH POINTS

Various solvents were placed under 50 p.s.i.g. pressure of carbon dioxide for twelve hours. Flash points were determined by a "Tag" closed tester for liquids below 175° F. manufactured by C. J. Tagliabue Mfg. Co. of Brooklyn, N.Y. Carbonation raised the flash point in each instance. Flash points in the following chart are the average of three tests in each instance.

| Material | Carbonated, °F. | Uncarbonated, °F. |
|---|---|---|
| Mineral spirits | 112.3 | 110.2 |
| Xylol | 91 | 79 |
| Toluol | 45.3 | 39 |
| V.M. & P. naptha | 55.7 | 52.3 |

EFFECT OF CARBONATION ON CONDUCTIVITY

Various solvents were subjected to 100 p.s.i.g. pressure of carbon dioxide and their conductivity measured with a De Vilbiss Microampere DC Meter. Carbonation increased the conductivity in each instance.

| Material | Carbonated, $\mu a$. | Uncarbonated, $\mu a$. |
|---|---|---|
| n-Butyl alcohol | 65 | 30 |
| Isopropyl alcohol | 68 | 54 |
| Acetone | 80 | 68 |

CONCLUSION

The degree of rate of dispersion as evaluated by a fineness gage improves with increased carbonation roughly proportionately in the range of 7–100 p.s.i.g. Carbonation also results in increased "tinctorial strength" at all pressures from 7–100 p.s.i.g. but the increase is not proportional in all tests. With greater "tinctorial strength" and greater quality of dispersion, greater brightness of color is observed in the products. The above pressures in precarbonation, postcarbonation, or added during milling, interstitially spaces over one volume of carbon dioxide per volume of solvent. The final product will have from over one volume per volume up to four volumes per volume of carbon dioxide added. Alcohol solvents are capable of absorbing somewhat greater quantities of carbon dioxide, however.

It is now deemed obvious that there has been disclosed an improved method and apparatus for manufacturing paints and inks of the type which include a pigment, an organic solvent and interstitially spaced carbon dioxide. The method and apparatus provide improved dispersion and improved "tinctorial strength." The resulting product has the ability to inhibit "skinning." Carbonating paints and inks also reduces fire hazards.

The invention in its broader aspects is not limited to the specific steps, processes, compositions and apparatus shown and described, but departures may be made therefrom within the scope of the accompanying claims without departing from the principles of the invention and without sacrificing its chief advantages.

The embodiments of the invention in which an exclusive property or privilege is claimed are defined as follows:

1. A method of manufacturing paints and inks of the type which include a pigment and a liquid organic solvent, comprising:

storing the liquid organic solvent in an unvented tank;

feeding gaseous carbon dioxide into the unvented tank, maintaining an atmosphere of carbon dioxide in the tank above the level of the liquid organic solvent under a pressure of 7 to 100 p.s.i.g., said pressure being above the pressure at which the liquid organic solvent has an absorption coefficient greater than one volume of carbon dioxide per volume of liquid organic solvent and up to about four volumes of carbon dioxide per volume of liquid organic solvent and sufficient to inhibit vaporization of the liquid organic solvent, and causing the carbon dioxide to be absorbed in the liquid organic solvent and thereby carbonating the solvent;

delivering liquid organic solvent into the unvented tank under pressure sufficient to overcome the carbon dioxide atmosphere, so that the incoming liquid organic solvent absorbs carbon dioxide from the carbon dioxide atmosphere to prevent build up of pressure in the unvented tank;

thereafter feeding the carbonated solvent and the pigment into a mill and milling the pigment and solvent in the presence of the carbon dioxide from 1 hour up to 24 hours;

removing the milled product to a mixing tank and adding additional carbonated solvent thereto to provide the desired characteristics; and thereafter depositing the product into containers.

2. A method as set forth in claim 1 wherein the step of feeding the carbon dioxide into the tank includes pressurizing the unvented tank with carbon dioxide to about 50 p.s.i.g.

3. A method as set forth in claim 1 including feeding gaseous carbon dioxide into the mill during milling.

4. A method as set forth in claim 3 wherein the gaseous carbon dioxide is fed into the mill at a pressure in the range of 7 to 100 p.s.i.g.

References Cited

FOREIGN PATENTS

| 736,590 | 9/1955 | Great Britain | 106—309 |
| 1,071,502 | 6/1967 | Great Britain | 106—309 |

JOAN B. EVANS, Primary Examiner

U.S. Cl. X.R.

106—26, 27, 28, 32, 189, 191, 262, 267, 308, 309, 311; 252—307